March 23, 1971     C. M. LYNN     3,572,174

MULTIPLE WORK HOLDING INDEXING FIXTURE

Filed March 24, 1969     4 Sheets-Sheet 1

INVENTOR.
CHARLES M. LYNN

BY

*Drummond, Cahill & Phillips*

ATTORNEYS

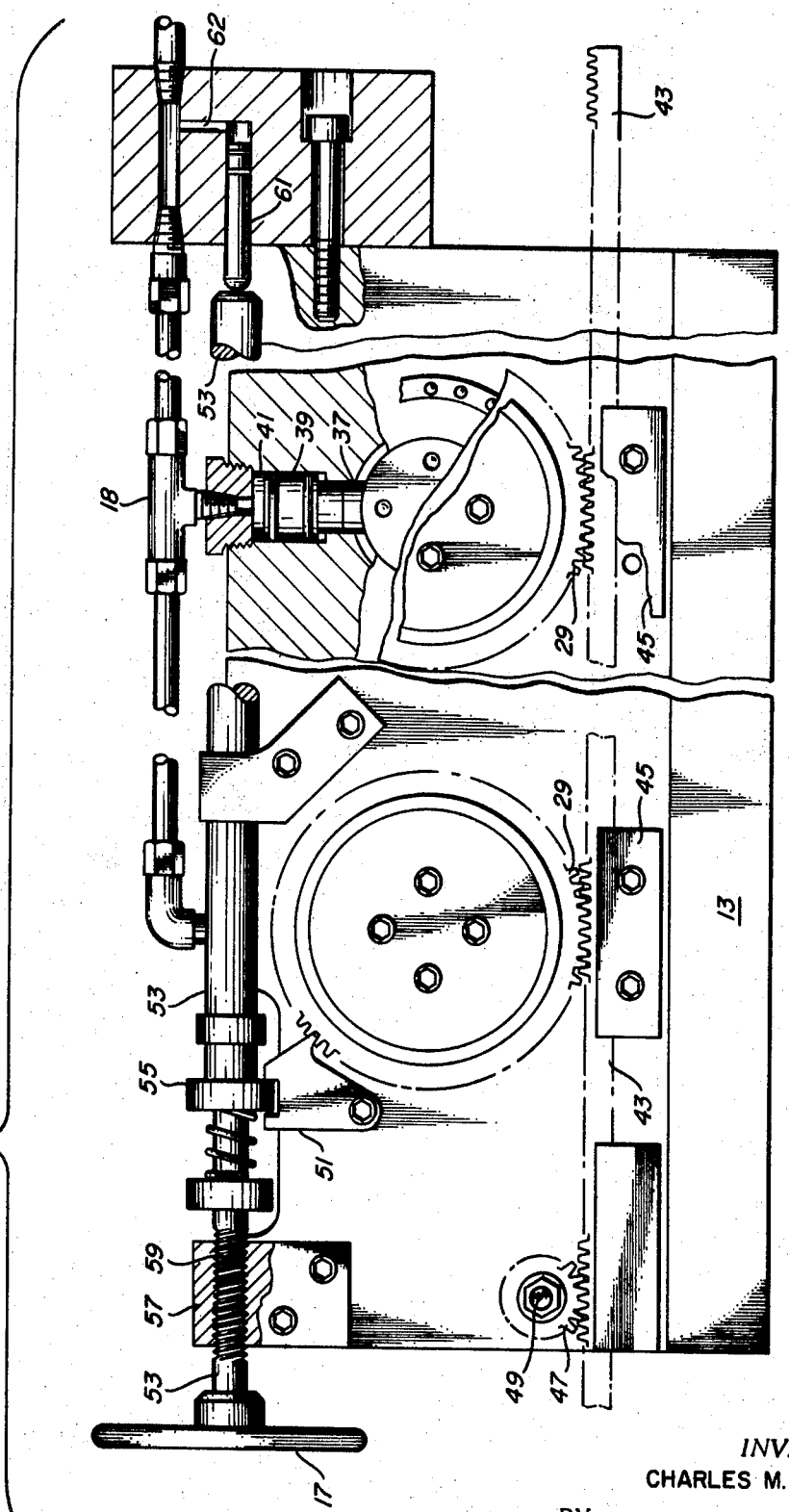

March 23, 1971  C. M. LYNN  3,572,174
MULTIPLE WORK HOLDING INDEXING FIXTURE
Filed March 24, 1969  4 Sheets-Sheet 3
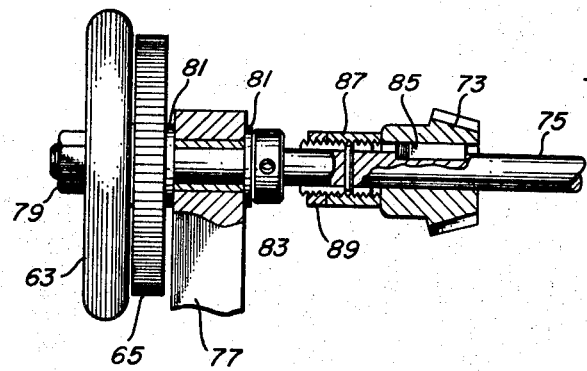
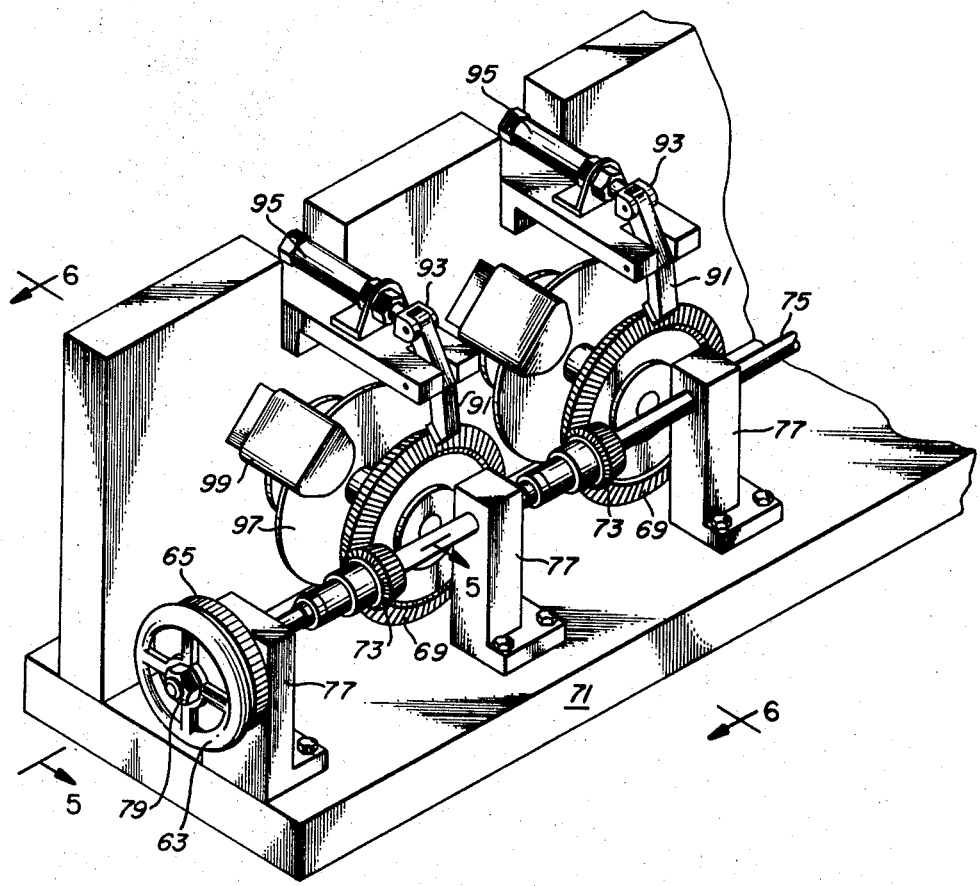
INVENTOR.
CHARLES M. LYNN
BY
Drummond, Cahill & Phillips
ATTORNEYS

INVENTOR.
CHARLES M. LYNN
ATTORNEYS

United States Patent Office 3,572,174
Patented Mar. 23, 1971

3,572,174
MULTIPLE WORK HOLDING INDEXING FIXTURE
Charles M. Lynn, 3447 N. 53rd St.,
Phoenix, Ariz. 85018
Filed Mar. 24, 1969, Ser. No. 809,545
Int. Cl. B23b *29/24;* F16h *57/00*
U.S. Cl. 74—822                                                    4 Claims

ABSTRACT OF THE DISCLOSURE

A multiple work holding indexing fixture is provided which can angularly orient a plurality of workpieces simultaneously for supporting and positioning the workpieces relative to a tool member for performing an operation thereon.

BACKGROUND OF THE INVENTION

This invention relates generally to a rotary indexing fixture and, more specifically, to a commonly indexed multiple fixture.

Rotary indexing fixtures are now well known in the art, and many different types and sizes of indexing fixtures are available for all indexing requirements. Indexing fixtures are used extensively on milling, drilling and boring machines to locate a workpiece in a precise position for one operation and then to rotate the workpiece to a second precise position for a second operation.

Typically, in order to carry out operations on a workpiece, the article must be fastened to an index face plate. The index plate must then be rotated through a given angle to the correct position for the machine tool to perform the required operation. The indexing fixture facilitates adjustment to the given angle with a degree of precision. Properly indexing the workpiece requires a skilled operator to precisely position the workpiece and to set the indexing. Only the machine operations that can be performed on the work article at the one given angle are carried out and then the operator must again index the workpiece to the next angle for the next operation. Generally, only one workpiece can be fastened to an index plate; and, therefore, formerly only one workpiece could be operated on during each indexing operation.

Since a skilled operator is required to precisely index each operation, it is an inefficient use of an operator's time that he must re-index each workpiece for each machining operation in those common instances when similar operations are to be performed on many workpieces. Previous multiple indexing fixtures require that a particular machining operation be performed on all of the workpieces at one indexing position. Each workpiece must be fastened to the face plate and then removed and replaced by another workpiece. The particular machining operation is performed on all of the workpieces before the prior art multiple indexing fixture is indexed to the next position for the next operation because the lock and brake of such prior art fixtures are not easily applied, and rotation of the index fixture to the next angular position is not easily and quickly accomplished. Therefore, a skilled workman still has to handle each workpiece for each operation.

SUMMARY OF THE INVENTION

The present invention alleviates the problem of inefficient use of a skilled workman's time by the use of an index fixture which can reliably index several workpieces for the performance of a machine operation on each workpiece after each indexing operation. A plurality of rotatable indexing face plates are journaled to a frame member and are commonly indexed through a prescribed angle. A lock and a brake are applied to each of the face plates to hold them in a precise position for the machining operation.

Accordingly, it is an object of the present invention to provide a multiple, work-holding, index fixture.

Another object of this invention is to provide an improved and relatively simplified indexing control for a multiple work-holding fixture.

A further object is to provide a multiple work-holding fixture wherein all fixtures are indexed by a common control.

Yet another object is to provide a multiple work-holding fixture wherein all of the fixtures are reliably held in the precise working position by a locking mechanism.

Still another object is the provision of a multiple work-holding fixture which is simple in construction and capable of rapidly and accurately positioning several workpieces on a machine tool.

These and other objects of the invention will become more readily apparent to those skilled in the art according to preferred embodiments as the description proceeds and the novel features which characterize the invention will be pointed out with particularity in the claims forming a part of this specification.

BRIEF DESCRIPTION OF THE DRAWING

Further features and a more specific description of illustrated embodiments of the invention are presented hereinafter with reference to the accompanying drawing, in which:

FIG. 3 is a detailed cross-sectional view of FIG. 1 showing the positioning, braking and locking means for use in an embodiment of the present invention;

FIG. 4 is a perspective view of another embodiment according to the present invention;

FIG. 5 is a detailed cross-sectional view of the adjustment control taken along lines 5—5 of FIG. 4.

DETAILED DESCRIPTION OF THE PREFERRED EMBODIMENTS

Although this description will discuss the present invention as embodied in a machine tool of the type for performing operations such as drilling, boring, milling and the like, it will be appreciated that the invention has general application to the machine tool field and will also find application beyond that field in areas where indexing and supporting of a workpiece or other article are required.

Figure 1:
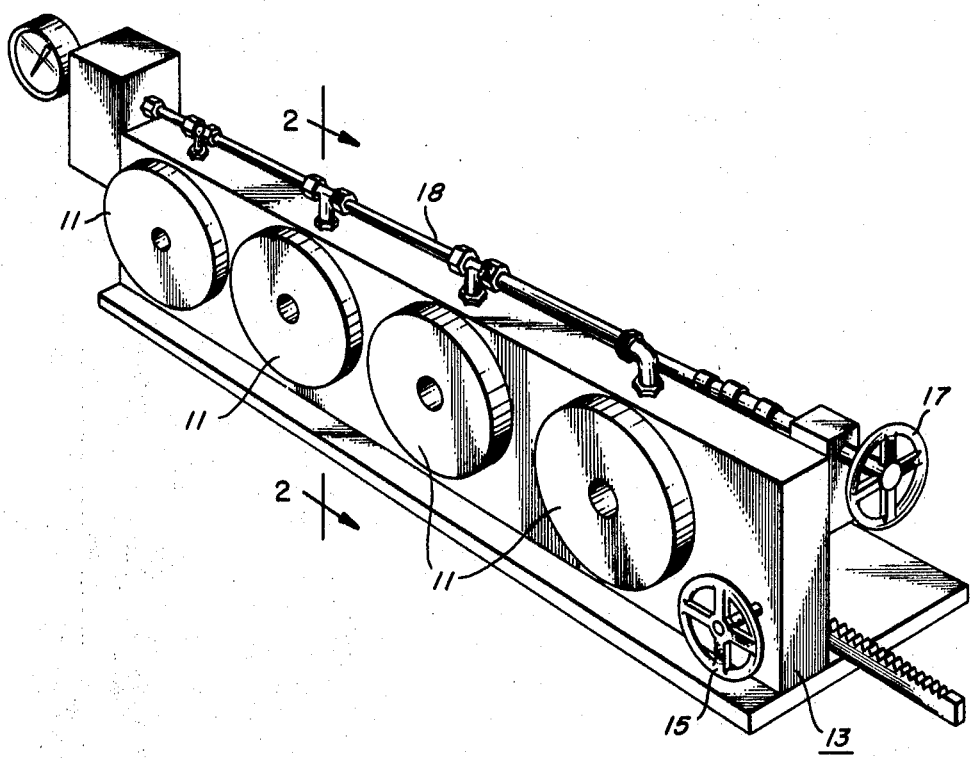
FIG. 1 is a perspective view of a multiple work-holding fixture.

FIG. 1 depicts a multiple indexing fixture comprising a group of face plates 11 mounted on an elongated frame member 13. A fixture is primarily a holding device which anchors a workpiece firmly in place for a machining operation; but it does not form a guide for the tool. An indexing fixture can be used for machine operations that are to be performed in more than one plane. It facilitates location of the given angle with a degree of precision. Each of the face plates 11 could be index heads onto which a workpiece is fastened in order to rotate, that is, index, the workpiece through a desired angle—usually equal divisions of a circle—by means of turning an index crank 15, which controls the interposed gear train. A great variety of index heads is available and can be used with the present invention.

Still referring to FIG. 1, the index crank 15, through an appropriate gear train (shown in FIG. 3), rotates all of the face plates 11 of the multiple indexing fixture into position at the same time. The face plates 11 are then held into position by locking means (also shown in FIG. 3) through a hand crank 17 rotatably mounted on the frame member. Hydraulic pressure is fed through a pipe 18 and is used to apply a braking force to each of the face plates 11 to hold each workpiece in a precise position during the machining operation. The bottom of the frame member 13 is ground smooth so as to accurately seat upon the work table of a machine tool.

Figure 2:
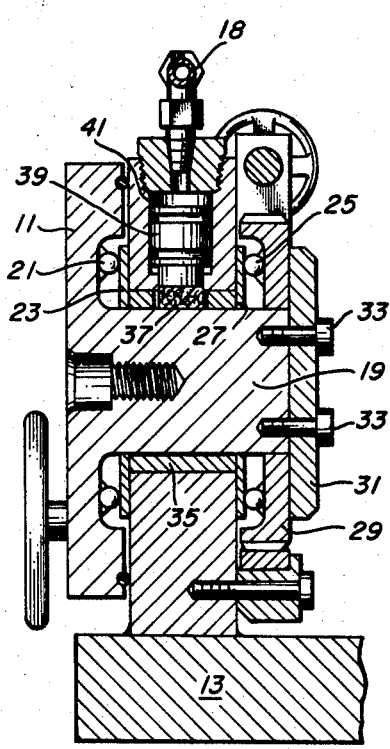
FIG. 2 is a cross-sectional view taken along lines 2—2 of FIG. 1.

FIG. 2 illustrates the manner in which the face plate 11 is journaled to the frame member 13. The face plate 11 and shaft 19 are machined from one piece, and the combination is rotatably mounted to the frame member on the front by a thrust retainer 21 and bearing retainer 23. On the rear face of the frame member, another thrust retainer 25 and bearing retainer 27 provides a low friction surface for a driving spur gear 29 fixed to the shaft 19. A bearing cap 31 is fastened to the shaft by machine bolts 33 to keep the assembly firmly journaled to the frame member. A bushing 35 provides a low frictional surface for rotation of the shaft 19 within the frame member 13.

Still referring to FIG. 2, a brake shoe 37, through a piston 39, and a cylinder 41, apply a force against the shaft 19 of the face plate to hold the workpiece in position during a machining operation. Hydraulic pressure is applied from a source (see FIG. 1) through the pipe 18 to the cylinder 41 and forces the piston 39 downward. The piston in turn drives the brake shoe 37 into contact with the shaft 19 thereby firmly preventing further motion of the face plate 11. A locking means, shown in FIG. 3, applies a holding force to precisely locate the angle of the face plate.

In FIG. 3 an embodiment of the drive and holding means of the multiple work holding indexing fixture is shown. In this embodiment the work holding face plates are journaled to a frame member as shown and described in FIG. 2. A spur gear 29 is fastened to the rear portion of each face plate, and the plurality of spur gears 29 are rotated by a rack gear 43 common to each spur gear of the plurality. The rack gear 43 is slideably driven along the frame member 13 within a plurality of guides 45 by a pinion 47 journaled to the frame member by a shaft 49. A hand wheel 15 (see FIG. 1) is fastened to the end of the shaft 49 opposite the pinion gear 47. Rotating the hand wheel 15 rotates the pinion gear 47 and causes the rack gear 43 to move along its guides 45. The rack gear 43 in turn rotates all of the face plates by rotating the plurality of spur gears 29.

A locking index pawl 51 is rotatably fastened to the frame member adjacent each of the spur gears 29. The locking pawl 51 is rotated into and out of the path of the spur gear by a hand crank 17 which rotates a shaft 53. The operation of the locking pawl is best understood with reference to FIG. 3. Rotating the hand crank 17 causes a collar 55 to move longitudinally in accordance with the threaded grooves 57 formed in the frame member and the threads 59 on the shaft 53.

Still referring to FIG. 3, the cutaway section provides another view of the action of the braking means applied to the face plate to hold the face plate in position during a machining operation. As stated previously, the braking means comprises a brake shoe 37, a piston 39 in a cylinder 41 and a pipeline 18 to convey the hydraulic pressure for applying the brake. As the hand crank 17 is rotated such that the shaft 53 advances and bears against a piston 61, hydraulic pressure created by the movement of the piston 61 is communicated through a tube 62 to the pipeline 18, thereby applying a holding force to the braking means. A tube 62 bleeds off a portion of the hydraulic fluid and forces the piston 61 against the shaft 53 which rotates the locking pawl 51 into position.

The operation of this embodiment can best be described by referring to FIGS. 1 and 3. First, similar workpieces are fastened in a like position on each face plate 11 so that a similar operation can be performed on each workpiece. The hand crank 15 is rotated which in turn rotates the gear pinion 47 and causes the rack gear 43 to slide along its guides 45. The rack gear 43 causes all of the spur gears 29 and, therefore, all of the face plates 11, to rotate into position. The indexing calibrations are disposed around the circumference of one of the face plates 11 in order to index the workpiece in the correct operating position In this embodiment, the spur gear 29 has 72 teeth around its circumference and, since the locking index pawl 51 precisely locates each spur gear and thereby each face plate 11, the locating calibrations on the circumference of the face plate are every five degrees. Changing the number of teeth in the spur gear changes the number of positions which can be indexed and, therefore, judicious selection of the number of teeth in the gear allows many different indexing increments.

The index fixture is generally utilized to support the workpiece so that a machine operation can be performed thereon. The similar articles are supported on each face plate to undergo a number of machining operations at different points thereon, and it is, therefore, necessary that the face plates be capable of moving the workpiece, or pieces, through a prescribed angular distance at the completion of one machine operation to properly position the workpiece for a successive machining operation. To this end, one indexing control is provided on the present invention which is effective to index the several face plates through a prescribed number of angularly spaced operational positions to allow several workpieces to be worked on at any one operational position.

After the workpiece is correctly positioned for the machining operation, the hand crank 17 is rotated to bring the locking pawl 51 into engagement between the teeth of each of the plurality of spur gears 29. This precisely positions the workpiece in the correct angular position. The brake is then applied to hold the face plate in position during the machining operation. Applying the brake shoe 37 to the face plates 11 also applies a brake 61 to the locking means as previously described. This prevents the removal of the locking pawl 51 during the machining operation.

FIG. 4 shows a preferred embodiment of a control of a multiple work-holding fixture according to the present invention. The index face plates 67 are rotated into position by a hand wheel 63. The hand wheel 63 includes a calibrated drum 65 which contains the indexing calibrations used to indicate a rotational position of the index face plates. In this preferred embodiment (see FIG. 6), the index face plates 67 are rotated into position by bevel gears 69 attached to each of the face plates 67 journaled to the frame member 71. Bevel pinions 73 are used to rotate each of the bevel gears 69. The bevel pinions are fastened to a shaft 75 which is common to all of the bevel pinions. The shaft 75 is journaled to several uprights 77 which hold the bevel pinions 73 in engagement with the bevel gears 69.

The hand wheel 63 is fastened to the shaft 75 by a nut 79 placed on a threaded end of the shaft as shown in FIG. 5. A thrust washer 81 and a shaft collar 83 hold the shaft 75 firmly in place against the upright 77. The bevel pinion 73 is constrained to rotate with the shaft by a key 85 placed in a keyway formed in the bevel pinion and the shaft. The bevel pinion 73 is held in place against the bevel gear by an adjustment nut 87 which is placed on a threaded portion of the shaft. The adjustment nut 87 is used to take up any backlash that occurs between the bevel pinion and the bevel gear. An adjustment locking nut 89 is also provided to prevent the adjustment nut 87 from loosening during a machining operation. A similar arrangement is provided along the length of the shaft for each bevel gear-face plate combination provided in the multiple indexing fixture.

In the embodiment shown in FIG. 4, the bevel gear 69 comprises 72 teeth and, therefore, the calibrated drum 65 is marked off in five degree increments. By the use of a different bevel gear such as one which contains 360 teeth, it is entirely possible to obtain a multiple indexing fixture which can rotatably index a plurality of workpieces through one degree increments. Therefore, the use of the bevel gear containing 72 degrees is not to be taken as a limitation on the present invention.

A locking means comprising a locking lever pawl 91 and a clevis 93 and a hydraulic piston 95 are shown in FIG. 4 as the locking means for holding the face plate in position after it has been rotated according to the next operation through use of the hand wheel 63 while monitoring the calibrated drum 65. A locking means is provided for each of the indexing face plates and each is positioned to rotate the locking lever pawl 91 in between two teeth of the bevel gear 69. The locking means prevents the further rotation of the face plates 67 and positions and indexes the face plate at the exact angle required. Since the bevel gear 69 is rigidly fastened to the face plate, applying the locking lever pawl 91 to the bevel gear of each of the multiple work-positioning index face plates, each of the face plates is held in the precise position regardless of any small amount of backlash which might be present between the bevel gear 69 and the associated bevel pinions 73, and the hand wheel 63.

Braking means are provided for each of the face plates to hold the workpieces fastened to the face plate in a rigid position during the machining operation. The braking means prevents the rotational stresses, applied to the index face plate through the workpiece by the machining operation, from affecting the locking of the indexing mechanism. Since the locking mechanism provides the precise rotational alignment of the face plate, any stress transferred to the locking lever pawl might cause a misalignment. The braking means shown in the preferred embodiment comprises a brake disc 97 and a brake shoe 99 fastened to each of the multiple face plates 67, see FIGS. 4 and 6. Hydraulic pressure is applied to all of the brake shoes 99 through a common supply source, not shown.

Figure 6:
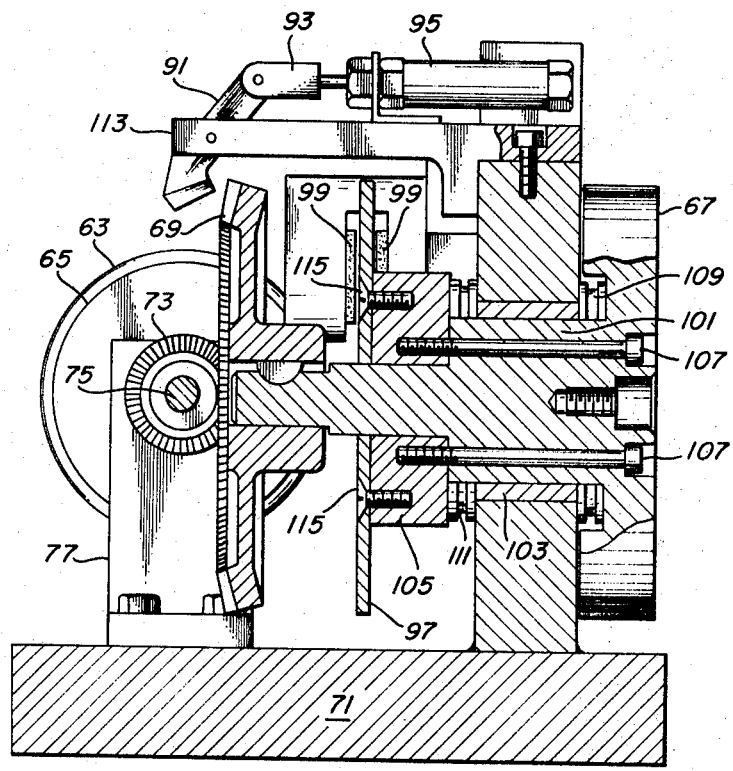
FIG. 6 is a detailed cross-sectional view taken along lines 6—6 of the embodiment shown in FIG. 4.

Referring to FIG. 6, a cross-sectional view of one face plate 67 and drive system is shown. The face plate 67 and shaft 101 combination is journaled to the frame member 71 by a bushing 103. A collar 105 is fastened to the face plate combination by bolts 107. Two thrust bearings 109 and 111 provide low friction surface, for rotation of the face plate 67.

The bevel gear 69 for rotating the face plate 67 is fastened to the shaft 101 at the end opposite the face plate. The upright 77 holds the bevel pinion 73 and hand wheel 63 in place for rotation of the bevel gear. As shown, the locking pawl 91 is rotatably fastened to an extension 113 of the frame member 71 and the clevis 93 rotatably fastens the locking pawl 91 to the hydraulic piston 95.

The relationship of the brake disc 97 and the brake shoes 99 is also shown in FIG. 6. The brake disc 97 is fastened to the collar 105 by bolts 115. The brake shoes 99 are positioned on both sides of the brake disc 97 and are actuated by a hydraulic system (not shown). Actuating the hydraulic system causes the brake shoes to contact the brake disc on both sides and thereby provide a high frictional force to prevent rotation of the brake disc and the face plates.

An operation is performed on the multiple work holding indexing fixture shown in FIGS. 4 and 6, by first fastening the workpieces to each of the face plates 67. The hand wheel 63 is then rotated to position each of the workpieces into the correct rotational position according to the calibrated drum 65. A hydraulic valve is then opened to apply the locking lever pawl 91 to each of the bevel gears 69 to precisely align each of the face plates 67. The brake shoes 99 are then applied to all of the brake discs 97 to firmly hold the workpieces into position. The necessary machining operation is then performed on each of the workpieces in turn until all of the required operations are finished for that position.

After this operation is finished, the brake shoes 99 and the locking lever pawls 91 are released, thereby freeing the face plates 67 to be rotated into the next position. The hand crank 63 can then be rotated to the next position according to the calibrated drum 65 to angularly position all of the workpieces for the second machining operation simultaneously. The locking means and the braking means are again applied to commence the second machining operation.

What has been described are two embodiments illustrating the preferred apparatus according to the present invention. The fixtures, as shown comprise four indexing face plates, but it will be apparent that more or less indexing face plates could be placed in a frame member to be driven by a common direct indexing. Neither should the hand operations be taken to limit the methods whereby the workpieces are positioned inasmuch as automatic means might well be utilized. The braking and locking means shown are also not to be taken to limit the present invention, for other means, such as electrical solenoids could be used to apply the braking pressure to each face plate and to apply the locking pawl to each of the gear members fastened to the face plate.

It is to be understood that the invention herein described may have applications other than the specific examples shown and that there will be obvious to those skilled in the art many modifications which can be made without departing from the limits of the scope of this invention. It is intended that such modifications shall fall within the spirit and scope of the invention as recited in the following claims.

What is claimed is:
1. An indexing fixture comprising:
  (a) an elongated frame member;
  (b) a plurality of face plates, each of said face plates rotatably journaled to said frame member along its length and each adapted to support a workpiece;
  (c) a gear train comprising a plurality of bevel gears and bevel pinions, said gear train being adapted to rotate all of said face plates simultaneously to the same angular degree;
  (d) calibrated means for providing an indication of the angular position of said face plates;
  (e) locking means to lock each of said face plates into an angular indexed position; and
  (f) braking means to hold each of said face plates in position during a machining operation.

2. The indexing fixture according to claim 1 wherein each of said bevel pinions are individually adjustable to prevent backlash between said bevel pinions and said bevel gears.

3. A multiple indexing fixture adapted to simultaneously index several similar workpieces and to hold all of the workpieces during a machining operation, said multiple indexing fixture comprising:
  (a) an elongated frame member;
  (b) a plurality of face plates rotatably journaled to said frame member along its length, each of said face plates adapted to support a workpiece;
  (c) a plurality of bevel gears, each of said bevel gears fastened to a corresponding face plate to rotate therewith;
  (d) a plurality of bevel pinions fastened to a shaft journaled to said frame member, each of said bevel pinions positioned on said shaft to mesh with a corresponding bevel gear;
  (e) a handle fastened to the shaft to simultaneously rotate said bevel pinions and thereby rotate said bevel gears and said face plates;
  (f) a calibrated drum fastened to said handle to provide an indication of the angular position of said face plates;
  (g) a plurality of locking pawls, one of said locking pawls rotatably mounted adjacent a corresponding one of said bevel gears for engagement therewith;

(h) means to actuate said locking pawls;
(i) braking means mounted to said frame member adjacent each of said face plates to prevent rotation of said face plates; and
(j) means to actuate said braking means.

4. A multiple index fixture adapted to hold and simultaneously rotatably index several workpieces, said index fixture comprising:
(a) an elongated frame member;
(b) a plurality of face plates, each face plate journaled to said frame member along its length and each adapted to support a workpiece;
(c) a plurality of spur gears, each of said spur gears fastened to a corresponding face plate to rotate therewith;
(d) a rack gear slideably mounted in said frame member for engagement with each of said spur gears;
(e) a pinion fastened to a shaft journaled to said frame member for engagement with said rack gear;
(f) a handle fastened to said shaft for rotating said pinion and thereby rotating said spur gears and said face plates through said rack gear;
(g) calibrated means to index the angular position of said face plates;
(h) a plurality of index pawls, each of said index pawls rotatably mounted adjacent a corresponding spur gear to engage and disengage with said spur gear to lock and index each spur gear and thereby lock and index each face plate;
(i) means to rotate said plurality of index pawls;
(j) a plurality of braking means, each of said braking means having a brake shoe and a piston enclosed in a cylinder for actuating the brake shoe, each of said braking means mounted to said frame member adjacent a corresponding face plate such that the brake shoe contacts said face plate when actuated by said piston; and
(k) hydraulic means interconnecting said braking systems to actuate said pistons.

References Cited

UNITED STATES PATENTS

| | | | |
|---|---|---|---|
| 1,580,029 | 4/1926 | Fisher et al. | 74—822X |
| 2,924,153 | 2/1960 | Ehlinger | 74—822X |
| 3,049,032 | 8/1962 | Schabot | 74—826 |

FOREIGN PATENTS

| | | | |
|---|---|---|---|
| 992,509 | 5/1965 | Great Britain | 74—822 |

LEONARD H. GERIN, Primary Examiner

U.S. Cl. X.R.

74—411.5